Jan. 24, 1933.　　　F. G. BROTZ　　　1,895,145
TANK AND BOWL CONNECTION
Filed June 29, 1931　　2 Sheets-Sheet 1

Witnesses:
Delane Granger
Geo. R. Geiger

Frank G. Brotz
INVENTOR
BY Lyman C. Conger
ATTORNEY

Patented Jan. 24, 1933

1,895,145

UNITED STATES PATENT OFFICE

FRANK G. BROTZ, OF KOHLER, WISCONSIN

TANK AND BOWL CONNECTION

Application filed June 29, 1931. Serial No. 547,531.

My invention relates to improvements in tank and bowl connections for connecting a flush tank to a water closet bowl. It has hitherto been the common practice to mount the tank on the wall at an elevation above the bowl and connect the two by suitable fittings. Such fittings usually consist of a flush ball seat member, a nut for holding it in position, a flush pipe or elbow connected therewith and extending to the bowl, a spud and spud nut for the bowl, together with the necessary washers to render the assembly water-tight. These fittings are commonly of brass which is an expensive material, and considerable tapping and machining are required to secure accurate and waterproof fits and to form the numerous joints. In order to improve appearance and to prevent corrosion, the portions which are visible after installation are commonly plated with nickel or chromium and polished, which is a rather expensive procedure. As these fittings are somewhat unsightly even though plated, a flush pipe housing of the same material as the tank and bowl is often used to conceal them.

I propose to eliminate much of the expense connected with this method of connection and to make a much better appearing installation by mounting the tank directly on the bowl, eliminating a large number of costly fittings, and, since my connection is invisible from the exterior, eliminating the necessity of plating or the use of a flush pipe housing. This method eliminates all joints between fittings, reducing the time necessary for installation, and greatly minimizes opportunities for water leaks after the installation is completed.

A further object of my invention is to provide the tank with an overflow built integral with the connection, thus preventing the tank from overflowing, in case the ball cock becomes stuck or otherwise incapacitated.

Figure 1:
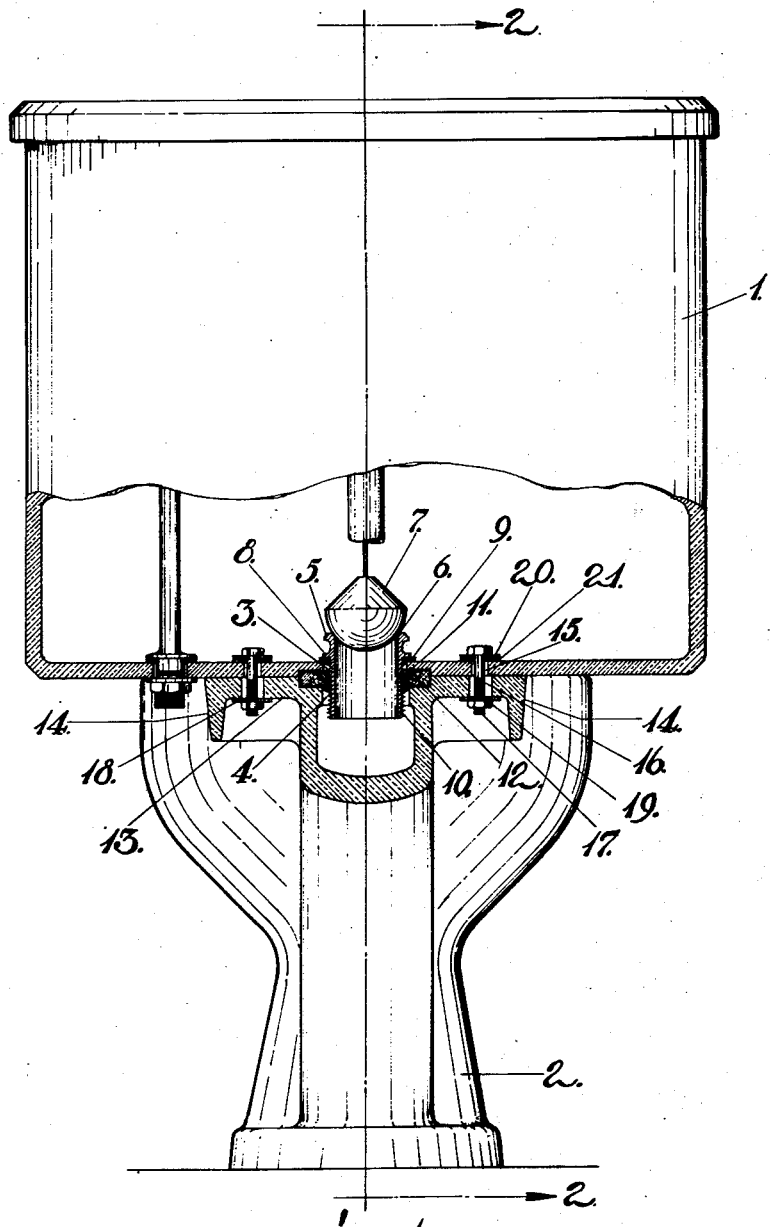
Figure 2:
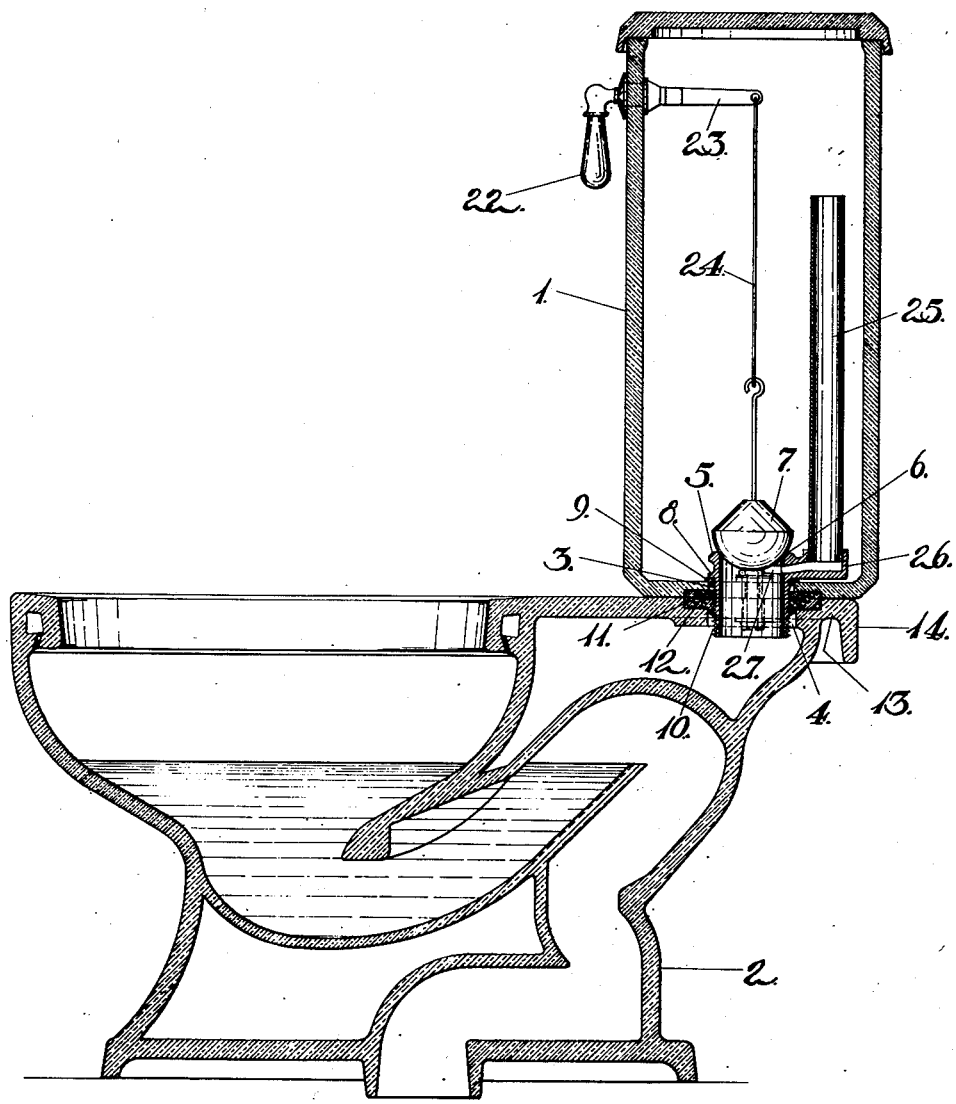

With the above and other objects in view, my invention consists of the mechanism illustrated in the accompanying drawings, in which Figure 1 is a rear view of the tank and bowl, partly in section, and Fig. 2 is a vertical section of the tank and bowl along the lines 2—2 of Fig. 1. Similar numerals refer to similar parts throughout the several views.

In the practice of my invention the flush tank 1 is mounted directly on the rear of the water closet bowl 2. The flush tank 1 is provided with an outlet aperture 3 which is axially alined with an inlet aperture 4 in the bowl 2. Fitted within these apertures is an annular flush ball seat member 5 having a bevelled seat at 6 for the flush ball 7 and a flange 8 which extends beyond the aperture 3 in the flush tank and has sealing engagement with the bottom of the tank. A gasket 9 of rubber or other suitable material is fitted beneath this flange to form a water-tight connection. The flush ball seat member 5 is exteriorly threaded at 10 and is provided with a nut 11 which is screwed upwardly against the tank, to clamp the flush ball seat member 5 in position. A gasket 12 of suitable material such as sponge rubber is fitted within coinciding recessed portions of the tank and bowl and is of such size that the closing of the tank and bowl together as hereinafter described will compress it firmly and bring it into firm engagement with the tank, bowl and flush ball seat member, thus forming a water-tight connection.

The rear portion of the bowl is extended to form a shelf at 13 having an overlapping edge or apron 14. The shelf 13 serves to support the tank and is provided with apertures 16 coinciding with similar apertures 15 in the bottom of the tank. Bolts 17 extend downwardly through these apertures and are secured by a washer 18 and a nut 19. Washers 20 are fitted beneath the head of the bolts 17 and serve to compress a gasket 21 against the bottom of the tank and prevent any leakage of water around the bolts.

In the installation of this tank I place the flush ball seat member 5 on the tank and secure it tightly thereto by means of the nut 11. The gasket 12 is then placed in the recessed portion of the bowl and the tank is placed on the bowl. The bolts 17, together with their washers and gaskets, are then placed in position and screwed up tightly. This draws the tank and bowl together, compressing the gasket 12 and preventing any leaks around the connection. The whole makes a very compact and convenient installation, and reduces the number of parts and joints considerably. As the function of the bolts 17 is to fasten the tank to the bowl and to compress the gasket 12, it is evident that many equivalent fastening means may be used without departing from the spirit of my invention.

To prevent damage by water in case of the ball cock becoming stuck and the tank overflowing, I provide an overflow whereby the water is drained off through the bowl after it reaches a predetermined height in the tank. This overflow consists of an overflow tube 25 which is threaded into an extension 26 of the flush ball seat member 5. The bore of the tube 25 registers with a channel in the extension 26 which opens into the bore of the flush ball seat member at 27.

The flushing operation of the tank is the same as that used with ordinary connection, a trip lever 22 operating through a link 23 and a rod 24 to raise the flush ball 7 and allow a quantity of water to pass from the tank into the bowl, the flush ball reseating itself by gravity when the water level in the tank becomes sufficiently low.

What I claim as new and desire to secure by Letters Patent is:

1. In a flush tank and water closet bowl connection, the combination of a flush tank having an outlet aperture, a water closet bowl having an inlet aperture, a flush ball seat member positioned within said apertures, coinciding recessed portions of the tank and bowl contiguous to the aforesaid apertures, a gasket of sponge rubber positioned within said recessed portions of the tank and bowl, said gasket being of a thickness substantially greater than the width of the interstice between the tank and bowl and sufficient to cause it when compressed to be forced into firm engagement with said flush ball seat member, and means for attaching the tank to the bowl and compressing the gasket as aforesaid.

2. In combination, a water closet bowl having an extended rear portion forming a shelf, a flush tank seated on said shelf, coinciding apertures in said bowl and tank, a flush ball seat member positioned within said apertures, coinciding recessed portions of the tank and bowl contiguous to the aforesaid apertures, a gasket fitting within said apertures, said gasket being of a thickness, when uncompressed, greater than the combined thickness of the aforesaid recessed portions of the tank and bowl, coinciding apertures in the tank and the aforesaid shelf of the bowl, bolts passing through said apertures and adapted, when drawn tight, to fasten the tank on the shelf of the bowl and to compress the gasket into the aforesaid recessed portions of the tank and bowl and to force it into firm engagement with the flush ball seat member.

3. In combination, a water closet bowl having an extended rear portion forming a shelf, a flush tank seated on said shelf, coinciding apertures in said bowl and tank, a flush ball seat member positioned within said apertures, coinciding recessed portions of the tank and bowl contiguous to the aforesaid apertures, a gasket of spongy, resilient material fitting within said apertures, said gasket being of a thickness, when uncompressed, greater than the combined thickness of the aforesaid recessed portions of the tank and bowl, coinciding apertures in the tank and the aforesaid shelf of the bowl, bolts passing through said apertures and adapted, when drawn tight, to fasten the tank on the shelf of the bowl and to compress the gasket into the aforesaid recessed portions of the tank and bowl and to force it into firm engagement with the flush ball seat member.

4. In a flush tank and water closet bowl connection, the combination of a flush tank, a water closet bowl, coinciding apertures in said tank and bowl, a flush ball seat member positioned in said apertures, coinciding recessed portions of said tank and bowl contiguous to said apertures, a gasket positioned within said recessed portions of the tank and bowl, said gasket being of such thickness as to be compressed and brought into firm engagement with the flush ball seat member throughout a substantial portion of the length when the lower surface of the tank is in engagement with the upper surface of the bowl, and means for holding the tank in engagement with the bowl and compressing the gasket as aforesaid.

FRANK G. BROTZ.